(No Model.)

E. J. BARLOW.
CULINARY UTENSIL.

No. 268,852. Patented Dec. 12, 1882.

Attest:
A. Barthel

Inventor:
Eliza J. Barlow
by her Atty

UNITED STATES PATENT OFFICE.

ELIZA J. BARLOW, OF GOWEN, MICHIGAN, ASSIGNOR TO NATHAN P. BARLOW AND HENRY WATSON, OF SAME PLACE.

CULINARY UTENSIL.

SPECIFICATION forming part of Letters Patent No. 268,852, dated December 12, 1882.

Application filed August 31, 1882. (No model.)

*To all whom it may concern:*

Be it known that I, ELIZA J. BARLOW, of Gowen, in the county of Montcalm and State of Michigan, have invented new and useful Improvements in Culinary Utensils; and I hereby declare that the following is a full, clear, and exact description thereof, reference being had to the accompanying drawings, which form a part of this specification.

This invention relates to certain new and useful improvements in the construction of a rim to be employed in connection with culinary vessels or utensils.

The object of the invention is to construct a rim which adapts the common utensils of the kitchen to each other, so that food may be cooked by hot water or steam without danger of burning or boiling over, and to prevent the water of condensation from running down the side of the vessel in which the food is held, and thereby checking or retarding the cooking process; and the invention consists in the peculiar construction of such rim, all as more fully hereinafter set forth.

Figure 1:
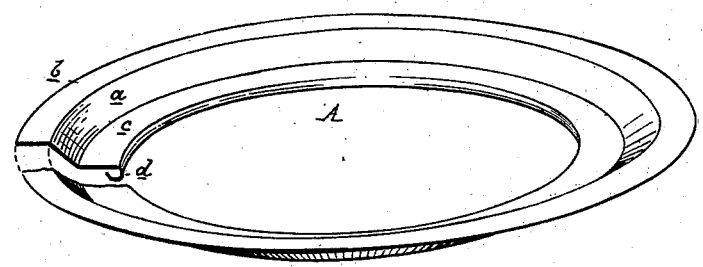
Figure 2:
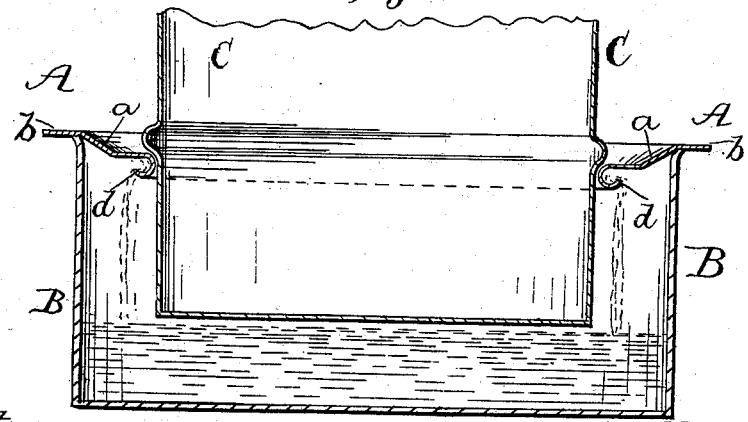

Figure 1 in the accompanying drawings shows my rim in perspective, part being broken away to show the gutter beneath; and Fig. 2 is a vertical sectional view of the rim and the vessels with which it may be used.

A represents what I denominate my steam-rim, which is preferably formed of sheet metal. This rim is formed with a bevel wall or side, $a$, which is provided with a flange, $b$, upon its top, and with an inwardly-projecting flange, $c$, at the bottom, the inner edge of which is turned down and back nearly upon itself, forming a gutter, $d$. In practice this rim is placed over the top of a kettle, B, or other vessel which contains water and sets upon the stove, while the vessel C, containing the food to be cooked, is set into the rim, which last vessel should be covered. The water in the lower kettle then boils and cooks the food in the upper kettle by the steam, as in culinary vessels which are made particularly for such purposes, while the steam which condenses upon the under side of this rim is conducted into the gutter $d$, from whence it flows back into the lower kettle without coming in contact with the walls of the upper or inner vessel or kettle. This condensed water, being of a temperature lower than that of live steam, would naturally retard the process of cooking; but by conveying it down, as described, it is reheated, so that the temperature is kept at about the same heat.

What I claim as my invention is—

1. In a vessel for culinary purposes, a steam-rim adapted to rest upon an outer vessel and support an inner vessel, and having a gutter formed thereon to deflect the water of condensation from the walls of said inner vessel, as described.

2. The metallic rim $a\ b\ c$, formed with gutter $d$, as described, and adapted to deflect the water of condensation, as and for the purpose specified.

ELIZA J. BARLOW.

Witnesses:
 E. H. JONES,
 HENRY WATSON.